3,275,161
CLOTHES RACK FOR AN AUTOMOBILE
Gordon W. Robertson, 1057 Bonita Drive,
Encinitas, Calif.
Filed Nov. 6, 1964, Ser. No. 409,518
2 Claims. (Cl. 211—87)

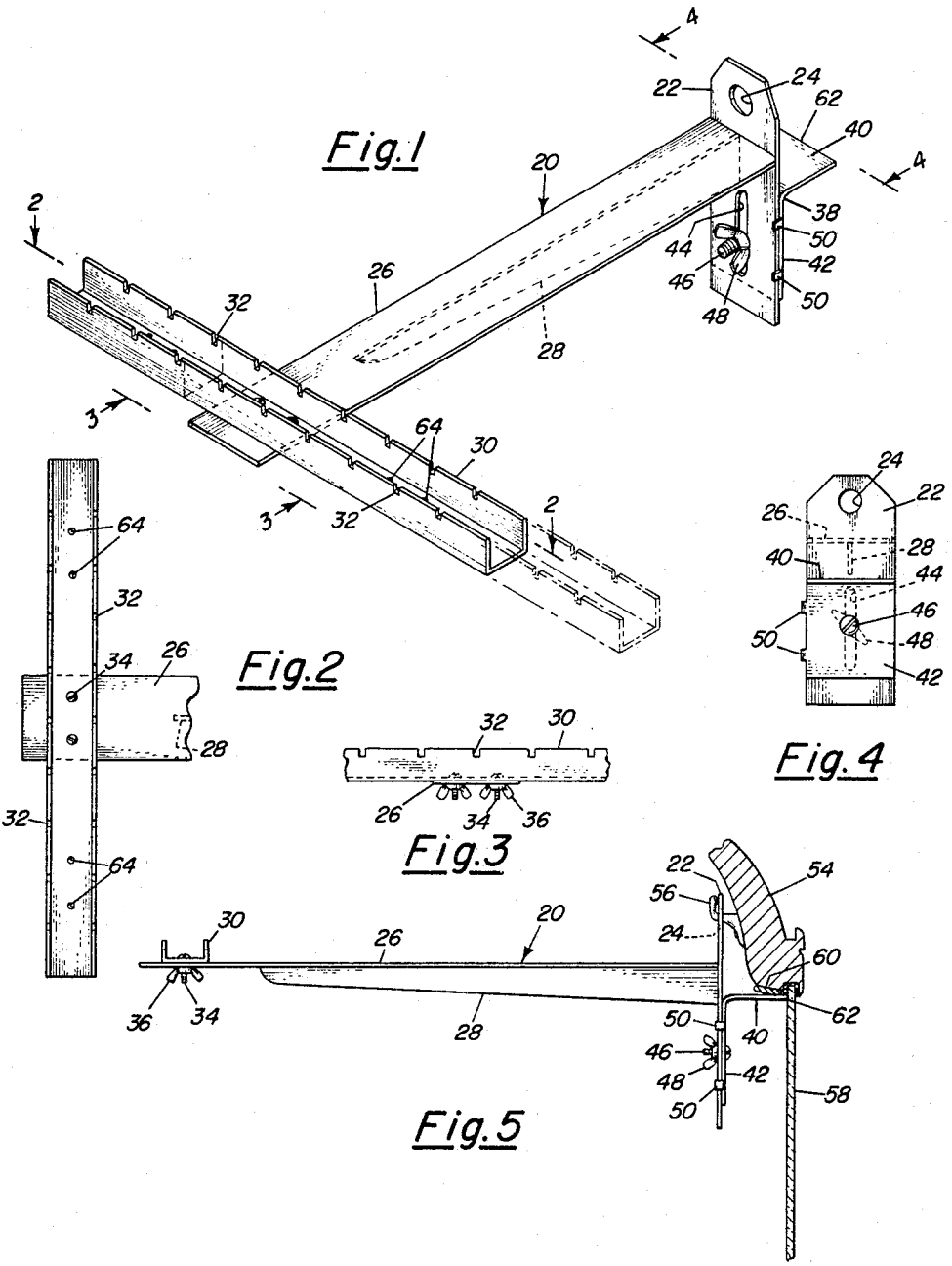
Sept. 27, 1966 — G. W. ROBERTSON — 3,275,161
CLOTHES RACK FOR AN AUTOMOBILE
Filed Nov. 6, 1964
INVENTOR.
GORDON W. ROBERTSON
ATTORNEYS United States Patent Office 3,275,161
Patented Sept. 27, 1966

The present invention relates to a clothes rack for an automobile and more particularly to a clothes rack which is adapted to be hung from a standard hook in the passenger compartment of an automobile.

The clothes rack includes a vertically extending plate having a hole for receiving a hook which is standard in and above one of the rear side windows of an automobile. A horizontally extending arm has one end carried by and extends inwardly and from one side of the plate. A laterally extending arm is carried by the opposite ends of the first mentioned arm and is adapted to support hooks of clothes hangers. Another horizontally extending arm is carried by the opposite sides of the plate and it is adapted to engage a part of the automobile, for example, a side window, directly below the hook for stabilizing the clothes rack.

Preferably, the stabilizing arm lies in a lower plane than the first mentioned arm and also, preferably, is adjustable vertically so that it can be adapted to various automobiles.

Other features and the advantages of the present invention will be apparent from the following description, reference being had to the accompanying drawing wherein a preferred embodiment of the invention is illustrated.

In the drawing:

FIG. 1 is a perspective view of the improved clothes rack;

FIG. 2 is a fragmentary view of the clothes rack looking in the direction of arrows 2—2 of FIG. 1;

FIG. 3 is a fragmentary view looking in the direction of arrows 3—3 of FIG. 1;

FIG. 4 is a fragmentary view looking in the direction of arrows 4—4 of FIG. 1; and FIG. 5 is a fragmentary view of a portion of an automobile showing the standard hook and one of the rear side windows of the automobile with the rack mounted thereon.

Referring more in detail to the drawing, the clothes rack 20 includes a vertically extending plate 22 having a hole 24 in the upper portion thereof. The front side of this plate carries a horizontal extending arm 26 having a reinforcing web 28 disposed preferably on the underside thereof. One end of the arm 26 is suitably fastened to the plate 22 as, for example, by welding. The free end of the arm 26 carries a transversely disposed arm 30, having a plurality of notches 32 in the upper portion thereof for receiving, for example, the hooks of clothes hangers. The arm 30 is removably attached to the arm 20 by screws 34 and wing nuts 36.

The rear side of plate 22 carries a stabliizing arm 38 having a horizontally extending section 40 and a vertically extending section 42. The stabilizing arm 38 is adjustable vertically. For this purpose the plate 22 is provided with a vertically extending slot 44 for receiving a screw 46 which extends through the vertically extending portion 42 of the arm 38 and through the slot 44. This screw receives a wing nut 48, which when tightened holds the arm 38 in the proper vertical position. The section 42 of the stabilizing arm 38 is provided with ears 50 which extend along a vertical edge of the plate 22 and form a guide for the arm 38.

A fragment of embodied portion of an automobile is shown at 54. This portion of the body is that which lies directly above one of the rear side windows of a sedan. Such body portion carries a hook 56. This hook is usually standard on sedan type automobiles. This section is disposed behind the driver's seat and the rear side window is shown at 58. A finishing rib of the automobile is shown at 60. When positioned, that is, when the plate 22 is hanging from the hook 56, as is shown in FIG. 5, the section 40 of the stabilizing device 28 lies directly below the finishing strips 60 and the edge 62 is in abutting relationship with the top section of the window 58. It will of course, be understood that the stabilizing arm 38 is adjusted to this position and held in that position by tightening the wing nut 48. When the clothes rack is in that position, drooping thereof is prevented since the edge of the stabilizing arm 38 is limited in its movement outwardly by being in engagement with the window 58. Also, the horizontal length of the section 40 of the arm 38 is sufficient to prevent swaying of the clothes rack either forwardly or rearwardly.

It will be observed from FIG. 2 that the transverse clothes hanger supporting arm 30 is provided with three sets of openings 64 for receiving the screws 34 whereby the arm may be fixed to the supporting arm 26 in various positions. One position is shown in full lines in FIG. 1 and another position in dotted lines. It is also to be understood that similar notches may be found in the arm 26 if it is desirable to hang clothes from that arm.

From the foregoing it will be seen that there has been provided a clothes rack which is simple in construction, can be readily attached and readily removed from the hook normally provided in an automobile.

While the form of embodiment herein shown and described, constitutes preferred form, it is to be understood that other forms may be adopted falling within the scope of the claims that follow.

I claim:

1. A clothes rack adapted to be hung from a standard hook in an automobile comprising:
    (A) A vertically extending plate having a hole for receiving a hook;
    (B) a horizontally extending arm having an end stationarily fixed to and extending from one side of the plate and below said hole;
    (C) a horizontally extending stabilizing arm extending from the opposite side of the plate and in a lower plane than the first mentioned arm;
    (D) and fastening means, adjustable vertically relative to the plate, for securing the stabilizing arm to the plate.

2. A clothes rack as defined in claim 1, characterized to include:
    (E) a laterally extending arm carried by the opposite end of the first mentioned arm.

References Cited by the Examiner

UNITED STATES PATENTS

| D. 181,237 | 10/1957 | Spielman | 224—42.45 |
|---|---|---|---|
| 1,575,270 | 3/1926 | Jankowsky | 211—87 |
| 2,500,881 | 3/1950 | Stader | 211—87 |
| 2,558,911 | 7/1951 | Penn | 224—42.45 |
| 2,599,824 | 6/1952 | Griffin | 211—87 |
| 2,681,194 | 6/1954 | Halvorsen | 248—29 |
| 2,937,762 | 5/1960 | Deuter | 211—87 |

CLAUDE A. LE ROY, Primary Examiner.

W. D. LOULAN, Assistant Examiner.